(12) United States Patent
Kang et al.

(10) Patent No.: US 12,693,423 B2
(45) Date of Patent: Jul. 28, 2026

(54) MOBILE TERMINAL AND CONTROL METHOD THEREFOR

(71) Applicant: LG ELECTRONICS INC., Seoul (KR)

(72) Inventors: Jinwon Kang, Seoul (KR); Yunsup Shin, Seoul (KR); Salkmann Ji, Seoul (KR); Changhwan Lee, Seoul (KR); Hangtae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 918 days.

(21) Appl. No.: 17/995,150

(22) PCT Filed: Apr. 1, 2021

(86) PCT No.: PCT/KR2021/004035

§ 371 (c)(1),
(2) Date: Sep. 30, 2022

(87) PCT Pub. No.: WO2021/201619

PCT Pub. Date: Oct. 7, 2021

(65) Prior Publication Data

US 2023/0184952 A1     Jun. 15, 2023

Related U.S. Application Data

(60) Provisional application No. 63/003,306, filed on Apr. 1, 2020.

(51) Int. Cl.
*G01C 3/08* (2006.01)
*G01S 7/4865* (2020.01)
*G01S 17/894* (2020.01)

(52) U.S. Cl.
CPC .......... *G01S 17/894* (2020.01); *G01S 7/4865* (2013.01)

(58) Field of Classification Search
CPC ............................ G01S 17/894; G01S 7/4865
See application file for complete search history.

(56) References Cited

U.S. PATENT DOCUMENTS 8,761,594 B1 * 6/2014 Gross .................... G01S 7/4817
                                                   396/155
10,244,181 B2  3/2019 Warren
(Continued)

FOREIGN PATENT DOCUMENTS

KR        2016-0046706        4/2016
KR      10-2016-0149068      12/2016
(Continued)

OTHER PUBLICATIONS

PCT International Application No. PCT/KR2021/004035, International Search Report dated Jul. 14, 2021, 5 page.
(Continued)

*Primary Examiner* — Mark Hellner
(74) *Attorney, Agent, or Firm* — LEE, HONG, DEGERMAN, KANG & WAIMEY

(57) ABSTRACT

The present invention relates to a mobile terminal including a lighting unit, and a control method therefor. The mobile terminal according to one embodiment of the present invention comprises: a lighting unit having a plurality of light sources; a sensor unit for receiving light outputted from the lighting unit and reflected off a subject; and a control unit for synchronizing, through the sensor unit, areas at which lights outputted from the plurality of light sources are emitted, and controlling, on the basis of preset conditions, the lighting unit so that at least one of the plurality of light sources emits light.

15 Claims, 12 Drawing Sheets

(a)

(b)

(56)        References Cited

U.S. PATENT DOCUMENTS

| | | | |
|---|---|---|---|
| 2016/0109232 A1* | 4/2016 | Shin | H04N 13/204 |
| | | | 348/140 |
| 2018/0007347 A1 | 1/2018 | Ko et al. | |
| 2018/0068458 A1 | 3/2018 | Wan et al. | |
| 2018/0332273 A1* | 11/2018 | Cho | H04N 13/128 |
| 2019/0304115 A1 | 10/2019 | Sladkov et al. | |

FOREIGN PATENT DOCUMENTS

| | | |
|---|---|---|
| KR | 2017-0026002 | 3/2017 |
| WO | 2016-105668 | 6/2016 |

OTHER PUBLICATIONS

European Patent Office Application Serial No. 21780268.5, Search Report dated Mar. 25, 2024, 11 pages.
Korean Intellectual Property Office Application No. 10-2022-7033676, Office Action dated Feb. 25, 2026, 6 pages.

* cited by examiner (a)                              (b)

(a)

(b)

(a)

(b)

(a)

(b)

(a)

(b)

COMMON  CATHODE (a)

COMMON  ANNODE (b)

(a)

(b)

(c)

(a)

(b)

MOBILE TERMINAL AND CONTROL METHOD THEREFOR

CROSS-REFERENCE TO RELATED APPLICATIONS

This application is the National Stage filing under 35 U.S.C. 371 of International Application No. PCT/KR2021/004035, filed on Apr. 1, 2021, which claims the benefit of U.S. Provisional Application No. 63/003,306, filed on Apr. 1, 2020, the contents of which are all hereby incorporated by reference herein in their entireties.

TECHNICAL FIELD

The present disclosure relates to a mobile terminal including a lighting unit, and more particularly, to a mobile terminal including a lighting unit capable of measuring a distance to a subject.

BACKGROUND ART

Terminals may be divided into mobile/portable terminals and stationary terminals according to mobility. Also, the mobile terminals may be classified into handheld types and vehicle mount types according to whether or not a user can directly carry.

Mobile terminals have become increasingly more functional. Examples of such functions include data and voice communications, capturing images and video via a camera, recording audio, playing music files via a speaker system, and displaying images and video on a display. Some mobile terminals include additional functionality which supports electronic game playing, while other terminals are configured as multimedia players. Specifically, in recent time, mobile terminals can receive broadcast and multicast signals to allow viewing of video or television programs As it becomes multifunctional, a mobile terminal can be allowed to capture still images or moving images, play music or video files, play games, receive broadcast and the like, so as to be implemented as an integrated multimedia player.

Recently, as performance of cameras has advanced, various functions using cameras have been developed. For example, development of functions to capture a high quality still image or video or generate a 3D image using depth information (or a depth value) of an image received through a camera have been actively developed.

For those various functions using cameras, a role of a light emitting element is important. Here, the light emitting element serves to emit light to a space corresponding to an image received through a camera.

Thus, the necessity to develop a light emitting element for performing various functions using a camera and a method for controlling a light emitting element have emerged.

DISCLOSURE OF INVENTION

Technical Problem

Therefore, to obviate those problems, an aspect of the present disclosure is to provide a mobile terminal including a lighting device capable of emitting light used to extract depth information about a subject using an optimized method, and a method for controlling the mobile terminal.

Another aspect of the present disclosure is to provide a mobile terminal including a lighting device optimized to measure a distance using a time of flight (ToF) scheme, and a method of controlling the mobile terminal.

Solution to Problem

To achieve these and other advantages and in accordance with the purpose of the present disclosure, as embodied and broadly described herein, there is provided a mobile terminal including: a lighting unit having a plurality of light sources; a sensor unit configured to receive light output from the lighting unit and reflected off a subject; and a control unit configured to synchronize, through the sensor unit, areas toward which lights output from the plurality of light sources are emitted, respectively, and control the lighting unit so that at least one of the plurality of light sources emits light on a basis of preset conditions.

A first light source among the plurality of light sources may be provided to emit light toward a first area, and a second light source, other than the first light source among the plurality of light sources, may be provided to emit light toward a second area other than the first area.

The first area may not overlap the second area.

The mobile terminal may further include a first optical system configured to refract the lights from the plurality of light sources to be emitted toward areas that do not overlap each other.

The mobile terminal may further include a second optical system provided such that the plurality of light sources respectively emits the lights toward a same area.

The control unit may be configured to control the plurality of light sources to vary density of the lights emitted toward the same area.

The control unit may be configured to: control the lighting unit so that a first number of light sources among the plurality of light sources emit light with a first density toward the same area, and control the lighting unit so that a second number of light sources greater than the first number of light sources, among the plurality of light sources, emit light with a second density higher than the first density toward the same area.

The control unit may be configured to, when at least part of the plurality of light sources emits light, control the at least part of the plurality of light sources to emit the light at same time.

The control unit may be configured to, when the at least part of the plurality of light sources (or the plurality of light sources) emits light, control the lighting unit so that the at least part of the plurality of light sources sequentially emits the light one by one.

When the plurality of light sources (or the at least part of the light sources) sequentially emit the light one by one, peak power needed for the plurality of light sources (or the at least part of the light sources) to emit the light may be constant regardless of a number of the at least part of the plurality of light sources emitting the light.

The control unit may be configured to independently control the plurality of light sources.

The control unit may be configured to supply different powers, or power in different periods, or power at different times to the plurality of light sources, respectively.

The control unit may be configured to control the plurality of light sources to emit light at times different from each other.

The control unit may be configured to control times at which and periods in which the plurality of light sources emits the light so that the periods in which the plurality of light sources emits the light partially overlap each other.

The control unit may be configured to generate a signal for measuring, by the sensor unit, a distance to the subject via the plurality of light sources emitting the light at the different times.

A method of controlling a mobile terminal may include: synchronizing areas toward which lights are output from a plurality of light sources; and emitting the lights on a basis of preset conditions, the emitting being performed by at least one of the plurality of light sources.

A first light source among the plurality of light sources may be provided to emit light toward a first area, and a second light source other than the first light source, among the plurality of light sources, may be provided to emit light toward a second area other than the first area.

The first area may not overlap the second area.

The plurality of light sources may be provided to emit the lights toward a same area, respectively.

The method may further include controlling the plurality of light sources to vary density of the lights with respect to the same area.

Advantageous Effects of Invention

In accordance with the detailed description, the present disclosure may provide a new lighting control method capable of measuring a distance only with respect to a partial area of a subject.

In addition, the present disclosure may also provide a new lighting control method capable of varying density of light needed to measure a distance to a subject, and thus, enhancing accuracy of the measurement of the distance to the subject by increasing the density of the light emitted toward the subject as needed.

MODE FOR THE INVENTION

Figure 1A:
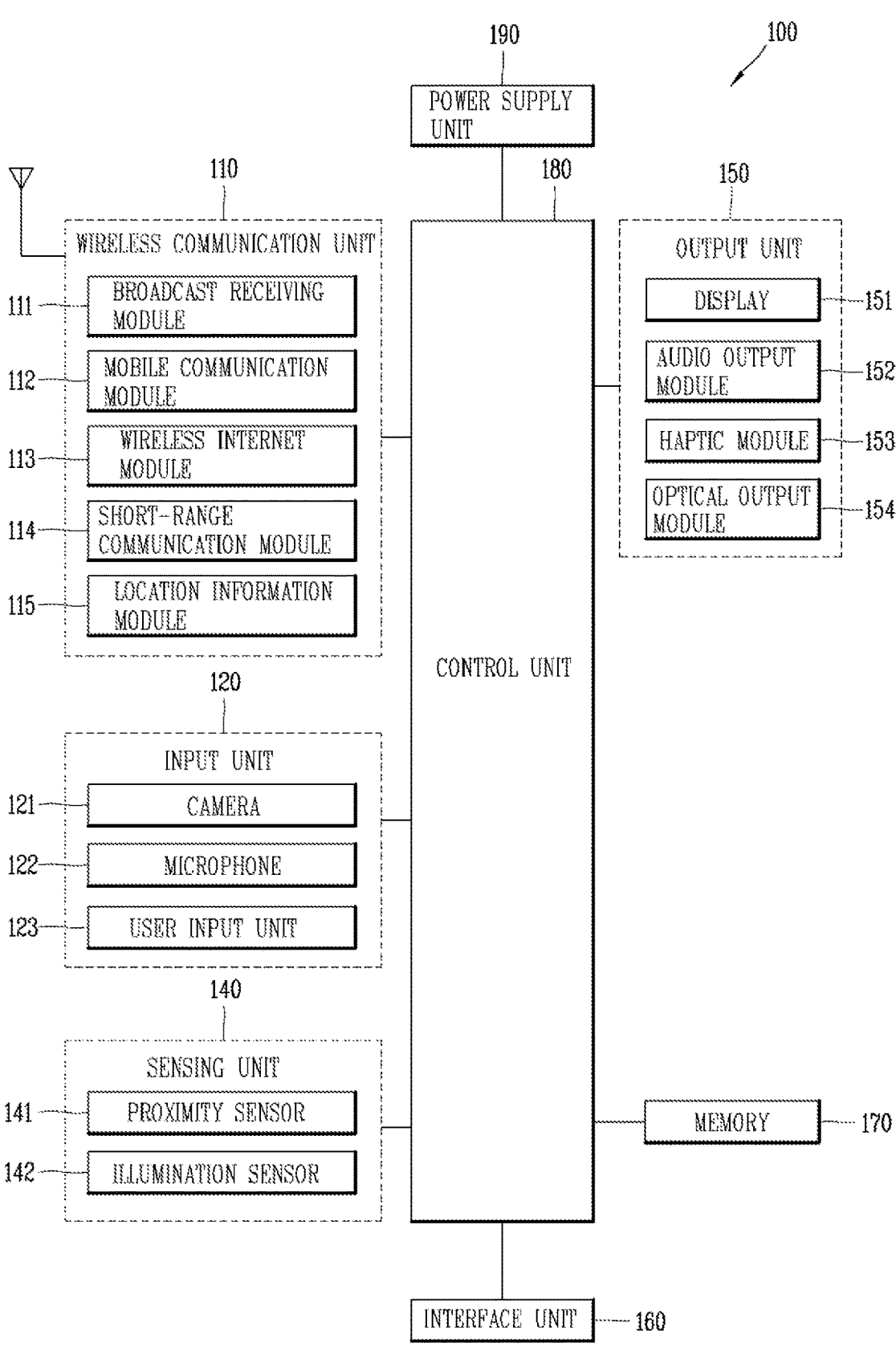
FIG. 1A is a block diagram of a mobile terminal according to the present disclosure.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
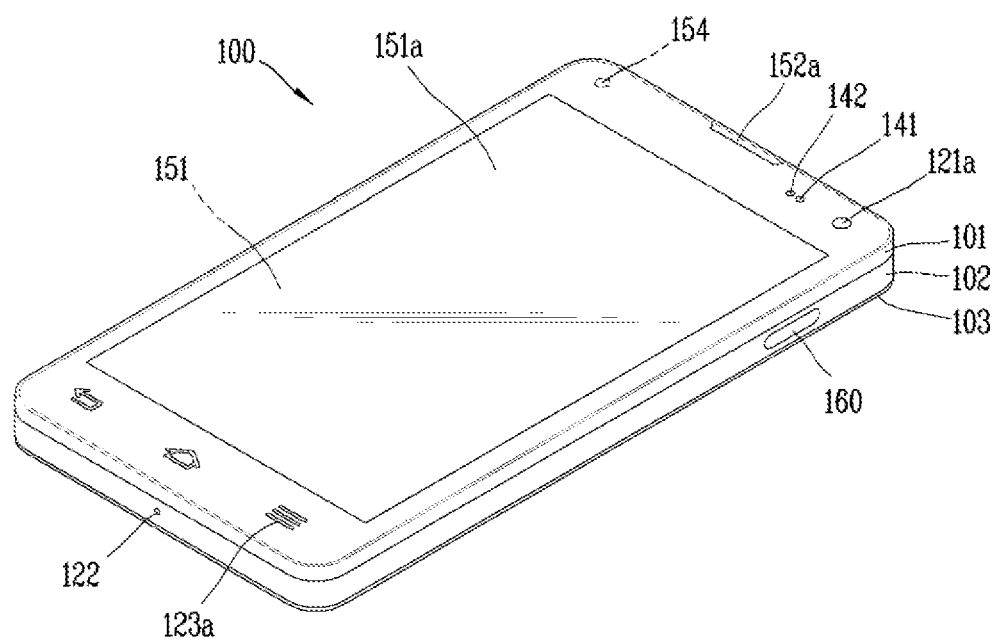
FIGS. 1B and 1C are conceptual views illustrating one example of the mobile terminal according to the present disclosure, viewed from different directions.
Figure 1C:
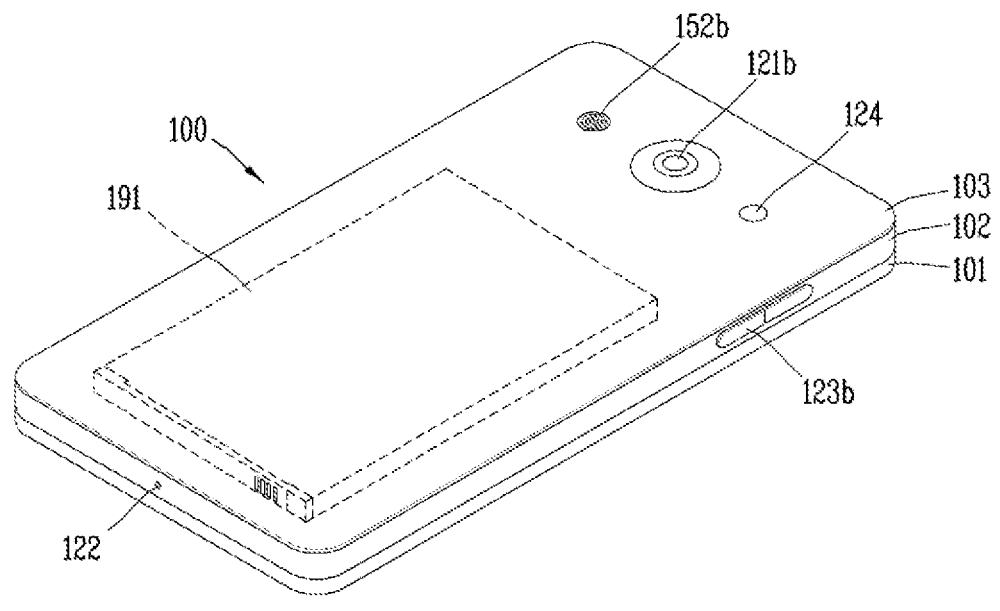

Referring to FIGS. 1A to 1C, FIG. 1A is a block diagram of a mobile terminal according to the present disclosure, and FIGS. 1B and 1C are conceptual views illustrating one example of the mobile terminal, viewed from different directions.

The mobile terminal 100 may be shown having components such as a wireless communication unit 110, an input unit 120, a sensing unit 140, an output unit 150, an interface unit 160, a memory 170, a control unit (or control unit) 180, and a power supply unit 190. It is understood that implementing all of the components illustrated in FIG. 1A is not a requirement. Greater or fewer components may alternatively be implemented.

In more detail, the wireless communication unit 110 may typically include one or more modules which permit communications such as wireless communications between the mobile terminal 100 and a wireless communication system, communications between the mobile terminal 100 and another mobile terminal, or communications between the mobile terminal 100 and an external server. Further, the wireless communication unit 110 may typically include one or more modules which connect the mobile terminal 100 to one or more networks.

The wireless communication unit 110 may include one or more of a broadcast receiving module 111, a mobile communication module 112, a wireless Internet module 113, a short-range communication module 114, and a location information module 115.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensing unit 140 may typically be implemented using one or more sensors configured to sense internal information of the mobile terminal, the surrounding environment of the mobile terminal, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from one or more sensors of the sensing unit 140, and combinations thereof.

The output unit 150 may typically be configured to output various types of information, such as audio, video, tactile output, and the like. The output unit 150 may be shown having at least one of a display 151, an audio output module 152, a haptic module 153, and an optical output module 154. The display 151 may have an inter-layered structure or an integrated structure with a touch sensor in order to implement a touch screen. The touch screen may function as the user input unit 123 which provides an input interface between the mobile terminal 100 and the user and simultaneously provide an output interface between the mobile terminal 100 and a user.

The interface unit 160 serves as an interface with various types of external devices that are coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions related to a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). Application programs may be stored in the memory 170, installed in the mobile terminal 100, and executed by the control unit 180 to perform an operation (or function) for the mobile terminal 100.

The control unit 180 typically functions to control an overall operation of the mobile terminal 100, in addition to the operations associated with the application programs. The control unit 180 may provide or process information or functions appropriate for a user by processing signals, data, information and the like, which are input or output by the aforementioned various components, or activating application programs stored in the memory 170.

Also, the control unit 180 may control at least some of the components illustrated in FIG. 1A, to execute an application program that have been stored in the memory 170. In addition, the control unit 180 may control at least two of those components included in the mobile terminal 100 to activate the application program.

The power supply unit 190 may be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

Hereinafter, description will be given in more detail of the aforementioned components with reference to FIG. 1A, prior to describing various embodiments implemented through the mobile terminal 100.

First, regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules may be utilized to facilitate simultaneous reception of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

The wireless signal may include various types of data depending on a voice call signal, a video call signal, or a text/multimedia message transmission/reception.

The wireless Internet module 113 refers to a module for wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

When the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

Here, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the control unit 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position (or current position) of the mobile terminal. As an example, the location information module 115 includes a Global Position System (GPS) module, a Wi-Fi module, or both. For example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal. The location information module 115 is a module used for acquiring the position (or the current position) and may not be limited to a module for directly calculating or acquiring the position of the mobile terminal.

The input unit 120 is for inputting image or video information (or signal), audio information (or signal), data, or user input. The mobile terminal 100 may include one or a plurality of cameras 121 through which such image information can be obtained. Such cameras 121 may process image frames of still pictures or video obtained by image sensors in a video or image capture mode. The processed image frames can be displayed on the display 151 or stored in memory 170. Meanwhile, the cameras 121 may be arranged in a matrix configuration to permit a plurality of images having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data can be processed in various manners according to a function being executed in the mobile terminal 100. If desired, the microphone 122 may include assorted noise removing algorithms to remove unwanted noise generated in the course of receiving the external audio signal.

The user input unit 123 is a component that permits input by a user. Such user input may enable the control unit 180 to control operation of the mobile terminal 100. The user input unit 123 may include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like, and generate a corresponding sensing signal. The control unit 180 generally cooperates with the sending unit 140 to control operations of the mobile terminal 100 or execute data processing, a function or an operation associated with an application program installed in the mobile terminal based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner area of the mobile terminal covered by the touch screen, or near the touch screen.

When the touch screen is implemented as a capacitance type, the proximity sensor 141 can sense proximity of a pointer relative to the touch screen by changes of an electromagnetic field, which is responsive to an approach of an object with conductivity. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, control unit 180 processes data corresponding to proximity touches and proximity touch patterns sensed by the proximity sensor 141, and cause output of visual information on the touch screen. In addition, the control unit 180 can control the mobile terminal 100 to execute different operations or process different data (or information) according to whether a touch with respect to a point on the touch screen is either a proximity touch or a contact touch.

A touch sensor senses a touch (or a touch input) applied to the touch screen (or the display unit 151) using any of a variety of touch methods. Examples of such touch methods include a resistive type, a capacitive type, an infrared type, and a magnetic field type, among others.

As one example, the touch sensor may be configured to convert changes of pressure applied to a specific part of the display 151, or convert capacitance occurring at a specific part of the display 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch control unit. The touch control unit may process the received signals, and then transmit corresponding data to the control unit 180. Accordingly, the control unit 180 may sense which area of the display 151 has been touched. Here, the touch control unit may be a component separate from the control unit 180, the control unit 180, and combinations thereof.

Meanwhile, the control unit 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches include a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize location information relating to a touch object using ultrasonic waves. The control unit 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors (TRs) at rows and columns to scan content received at the photo sensor using an electrical signal which changes according to the quantity of applied light. Namely, the photo sensor may calculate the coordinates of the physical object according to variation of light to thus obtain location information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

Also, the display 151 may be implemented as a stereoscopic display for displaying stereoscopic images.

A typical stereoscopic display may employ a stereoscopic display scheme such as a stereoscopic scheme (a glass scheme), an auto-stereoscopic scheme (glassless scheme), a projection scheme (holographic scheme), or the like.

The audio output module 152 may receive audio data from the wireless communication unit 110 or output audio data stored in the memory 170 during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceives, or otherwise experiences. A typical example of a tactile effect generated by the haptic module 153 is vibration. The strength, pattern and the like of the vibration generated by the haptic module 153 can be controlled by user selection or setting by the control unit. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal therethrough. Various command signals or power input from the cradle may operate as signals for recognizing that the mobile terminal is properly mounted on the cradle.

The memory 170 can store programs to support operations of the control unit 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The control unit 180 may typically control operations relating to application programs and the general operations of the mobile terminal 100. For example, the control unit 180 may set or release a lock state for restricting a user from inputting a control command with respect to applications when a status of the mobile terminal meets a preset condition.

The control unit 180 can also perform the controlling and processing associated with voice calls, data communications, video calls, and the like, or perform pattern recognition processing to recognize a handwriting input or a picture drawing input performed on the touch screen as characters or images, respectively. In addition, the control unit 180 can control one or a combination of those components in order to implement various exemplary embodiments disclosed herein.

The power supply unit 190 receives external power or provides internal power and supply the appropriate power required for operating respective elements and components included in the HMD 100 under the control of the control unit 180. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring to FIGS. 1B and 1C, the disclosed mobile terminal 100 includes a bar-like terminal body. However, the mobile terminal 100 may alternatively be implemented in any of a variety of different configurations. Examples of such configurations include watch type, clip-type, glasses-type, or a folder-type, flip-type, slide-type, swing-type, and swivel-type in which two and more bodies are combined with each other in a relatively movable manner, and combinations thereof. Discussion herein will often relate to a particular type of mobile terminal. However, such teachings with regard to a particular type of mobile terminal will generally apply to other types of mobile terminals as well.

Here, considering the mobile terminal 100 as at least one assembly, the terminal body may be understood as a conception referring to the assembly.

The mobile terminal 100 will generally include a case (for example, frame, housing, cover, and the like) forming the appearance of the terminal. In this embodiment, the case is formed using a front case 101 and a rear case 102. Various electronic components are interposed into a space formed between the front case 101 and the rear case 102. At least one middle case may be additionally positioned between the front case 101 and the rear case 102.

The display unit 151 is shown located on the front side of the terminal body to output information. As illustrated, a window 151*a* of the display unit 151 may be mounted to the front case 101 to form the front surface of the terminal body together with the front case 101.

In some embodiments, electronic components may also be mounted to the rear case 102. Examples of those electronic components mounted to the rear case 102 may include a detachable battery, an identification module, a memory card and the like. Here, a rear cover 103 for covering the electronic components mounted may be detachably coupled to the rear case 102. Therefore, when the rear cover 103 is detached from the rear case 102, the electronic components mounted on the rear case 102 are exposed to the outside.

As illustrated, when the rear cover 103 is coupled to the rear case 102, a side surface of the rear case 102 may partially be exposed. In some cases, upon the coupling, the rear case 102 may also be completely shielded by the rear cover 103. Meanwhile, the rear cover 103 may include an opening for externally exposing a camera 121*b* or an audio output module 152*b*.

The cases 101, 102, 103 may be formed by injection-molding synthetic resin or may be formed of a metal, for example, stainless steel (STS), aluminum (AI), titanium (Ti), or the like.

As an alternative to the example in which the plurality of cases form an inner space for accommodating components, the mobile terminal 100 may be configured such that one case forms the inner space. In this case, a mobile terminal 100 having a uni-body is formed in such a manner that synthetic resin or metal extends from a side surface to a rear surface.

Meanwhile, the mobile terminal 100 may include a waterproofing unit (not shown) for preventing introduction of water into the terminal body. For example, the waterproofing unit may include a waterproofing member which is located between the window 151*a* and the front case 101, between the front case 101 and the rear case 102, or between the rear case 102 and the rear cover 103, to hermetically seal an inner space when those cases are coupled.

The mobile terminal 100 may include a display unit 151, first and second audio output module 152*a* and 152*b*, a proximity sensor 141, an illumination sensor 142, an optical output module 154, first and second cameras 121*a* and 121*b*, first and second manipulation units 123*a* and 123*b*, a microphone 122, an interface unit 160, and the like.

Hereinafter, as illustrated in FIGS. 1B and 1C, description will be given of the exemplary mobile terminal 100 in which the front surface of the terminal body is shown having the display unit 151, the first audio output module 152*a*, the proximity sensor 141, the illumination sensor 142, the optical output module 154, the first camera 121*a*, and the first manipulation unit 123*a*, the side surface of the terminal body is shown having the second manipulation unit 123*b*, the microphone 122, and the interface unit 160, and the rear surface of the terminal body is shown having the second audio output module 152*b* and the second camera 121*b*.

However, those components may not be limited to the arrangement. Some components may be omitted or rearranged or located on different surfaces. For example, the first manipulation unit 123*a* may be located on another surface of the terminal body, and the second audio output module 152*b* may be located on the side surface of the terminal body other than the rear surface of the terminal body.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The display module 151 may include at least one of a liquid crystal display (LCD), a thin film transistor-LCD (TFT LCD), an organic light-emitting diode (OLED), a flexible display, a three-dimensional (3D) display and an e-ink display.

The display unit 151 may be implemented using two display devices, according to the configuration type thereof. For instance, a plurality of the display units 151 may be arranged on one side, either spaced apart from each other, or these devices may be integrated, or these devices may be arranged on different surfaces.

The display unit 151 may include a touch sensor that senses a touch with respect to the display unit 151 so as to receive a control command in a touch manner. Accordingly, when a touch is applied to the display unit 151, the touch sensor may sense the touch, and a control unit 180 may generate a control command corresponding to the touch. Contents input in the touch manner may be characters, numbers, instructions in various modes, or a menu item that can be specified.

On the other hand, the touch sensor may be configured in a form of a film having a touch pattern and disposed between a window 151*a* and a display (not illustrated) on a rear surface of the window, or may be a metal wire directly patterned on the rear surface of the window. Alternatively, the touch sensor may be formed integrally with the display. For example, the touch sensor may be disposed on a substrate of the display, or may be provided inside the display.

In this way, the display unit 151 may form a touch screen together with the touch sensor, and in this case, the touch screen may function as the user input unit (123, see FIG. 1A). In some cases, the touch screen may replace at least some of functions of a first manipulation unit 123*a*.

The first audio output module 152*a* may be implemented as a receiver for transmitting a call sound to a user's ear and the second audio output module 152*b* may be implemented as a loud speaker for outputting various alarm sounds or multimedia reproduction request sounds.

The window 151*a* of the display unit 151 may include a sound hole for emitting sounds generated from the first audio output module 152*a*. However, the present disclosure is not limited thereto, and the sounds may be released along an assembly gap between the structural bodies (for example, a gap between the window 151*a* and the front case 101). In this case, a hole independently formed to output audio sounds may not be seen or may otherwise be hidden in terms of appearance, thereby further simplifying the appearance of the mobile terminal 100.

The optical output module 154 may be configured to output light for indicating an event generation. Examples of such events may include a message reception, a call signal reception, a missed call, an alarm, a schedule alarm, an email reception, information reception through an application, and the like. When a user has checked a generated event, the control unit 180 may control the optical output module 154 to stop the light output.

The first camera 121*a* may process image frames such as still or moving images obtained by the image sensor in a capture mode or a video call mode. The processed image frames can then be displayed on the display unit 151 or stored in the memory 170.

The first and second manipulation units 123*a* and 123*b* are examples of the user input unit 123, which may be manipulated by a user to provide input to the mobile terminal 100. The first and second manipulation units 123*a* and 123*b* may also be commonly referred to as a manipulating portion. The first and second manipulation units 123*a* and 123*b* may employ any method if it is a tactile manner allowing the user to perform manipulation with a tactile feeling such as touch, push, scroll or the like. The first and second manipulation units 123*a* and 123*b* may also be manipulated through a proximity touch, a hovering touch, and the like, without a user's tactile feeling.

The drawings are illustrated on the basis that the first manipulation unit 123*a* is a touch key, but the present disclosure may not be necessarily limited to this. For example, the first manipulation unit 123*a* may be configured with a mechanical key, or a combination of a touch key and a push key.

The content received by the first and second manipulation units 123*a* and 123*b* may be set in various ways. For example, the first manipulation unit 123*a* may be used by the user to input a command such as menu, home key, cancel, search, or the like, and the second manipulation unit 123*b* may be used by the user to input a command, such as controlling a volume level being output from the first or second audio output module 152*a* or 152*b*, switching into a touch recognition mode of the display unit 151, or the like.

On the other hand, as another example of the user input unit 123, a rear input unit (not shown) may be disposed on the rear surface of the terminal body. The rear input unit may be manipulated by a user to input a command for controlling an operation of the mobile terminal 100. The content input may be set in various ways. For example, the rear input unit may be used by the user to input a command, such as power on/off, start, end, scroll or the like, controlling a volume level being output from the first or second audio output module 152*a* or 152*b*, switching into a touch recognition mode of the display unit 151, or the like. The rear input unit may be implemented into a form allowing a touch input, a push input or a combination thereof.

The rear input unit may be disposed to overlap the display unit 151 of the front surface in a thickness direction of the terminal body. As one example, the rear input unit may be disposed on an upper end portion of the rear surface of the terminal body such that a user can easily manipulate it using a forefinger when the user grabs the terminal body with one hand. However, the present disclosure may not be limited to this, and the position of the rear input unit may be changeable.

When the rear input unit is disposed on the rear surface of the terminal body, a new user interface may be implemented using the rear input unit. Also, the aforementioned touch screen or the rear input unit may substitute for at least part of functions of the first manipulation unit 123*a* located on the front surface of the terminal body. Accordingly, when the first manipulation unit 123*a* is not disposed on the front surface of the terminal body, the display unit 151 may be implemented to have a larger screen.

On the other hand, the mobile terminal 100 may include a finger scan sensor which scans a user's fingerprint. The control unit may use fingerprint information sensed by the finger scan sensor as an authentication means. The finger scan sensor may be installed in the display unit 151 or the user input unit 123.

The microphone 122 may be provided at a plurality of places, and configured to receive stereo sounds. The microphone 122 may be provided at a plurality of places, and configured to receive stereo sounds.

The interface unit 160 may serve as a path allowing the mobile terminal 100 to interface with external devices. For example, the interface unit 160 may be at least one of a connection terminal for connecting to another device (for example, an earphone, an external speaker, or the like), a port for near field communication (for example, an Infrared DaAssociation (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121*b* may be further mounted to the rear surface of the terminal body. The second camera 121*b* may have an image capturing direction, which is substantially opposite to the direction of the first camera unit 121*a*.

The second camera 121*b* may include a plurality of lenses arranged along at least one line. The plurality of lenses may be arranged in a matrix form. The cameras may be referred to as an 'array camera.' When the second camera 121*b* is implemented as the array camera, images may be captured in various manners using the plurality of lenses and images with better qualities may be obtained.

The flash 124 may be disposed adjacent to the second camera 121*b*. When an image of a subject is captured with the camera 121*b*, the flash 124 may illuminate the subject.

The second audio output module 152*b* may further be disposed on the terminal body. The second audio output module 152*b* may implement stereophonic sound functions in conjunction with the first audio output module 152*a*, and may be also used for implementing a speaker phone mode for call communication.

At least one antenna for wireless communication may be disposed on the terminal body. The antenna may be embedded in the terminal body or formed in the case. For example, an antenna which configures a part of the broadcast receiving module 111 (see FIG. 1A) may be retractable into the terminal body. Alternatively, an antenna may be formed in a form of film to be attached onto an inner surface of the rear cover 103 or a case including a conductive material may serve as an antenna.

The terminal body is provided with a power supply unit 190 (see FIG. 1A) for supplying power to the mobile terminal 100. The power supply unit 190 may include a batter 191 which is mounted in the terminal body or detachably coupled to an outside of the terminal body.

The battery 191 may receive power via a power cable connected to the interface unit 160. Also, the battery 191 may be (re)chargeable in a wireless manner using a wireless charger. The wireless charging may be implemented by magnetic induction or electromagnetic resonance.

On the other hand, the drawing illustrates that the rear cover 103 is coupled to the rear case 102 for shielding the battery 191, so as to prevent separation of the battery 191 and protect the battery 191 from an external impact or foreign materials. When the battery 191 is detachable from the terminal body, the rear case 103 may be detachably coupled to the rear case 102.

An accessory for protecting an appearance or assisting or extending the functions of the mobile terminal 100 may further be provided on the mobile terminal 100. As one example of the accessory, a cover or pouch for covering or accommodating at least one surface of the mobile terminal 100 may be provided. The cover or pouch may cooperate with the display unit 151 to extend the function of the electronic device 100. Another example of the accessory may be a touch pen for assisting or extending a touch input onto a touch screen.

Meanwhile, the mobile terminal related to the present disclosure may extract (detect, determine, sense) depth information from an image captured through a camera, using the camera and a lighting device (or a lighting unit, hereinafter used mixed with each other).

Also, the mobile terminal related to the present disclosure may capture (or generate) a 3D image using the camera and the lighting device. For example, the mobile terminal related to the present disclosure may convert (generate) a 2D image captured through the camera into a 3D image on the basis of the extracted depth information. similar manner. In another example, the mobile terminal related to the present disclosure may determine a distance to a subject on the basis of light irradiated from the lighting device and capture (or generate) a 3D image through the camera on the basis of the distance to the subject.

Hereinafter, a method for extracting depth information from an image captured using the camera and the lighting device will be described in detail with reference to the accompanying drawings. Hereinafter, extracting depth information from an image captured through the camera will be described, but related contents may also be inferred and applied to capturing (or generating a 3D image in the same/like manner.

The mobile terminal 100 related to the present disclosure may extract depth information received (or captured) through the camera 121 (please refer to FIG. 1A).

The image received through the camera may be referred to as a preview image. In detail, the preview image may refer to an image received through the camera in real time. The preview image may be changed as the mobile terminal having the camera 121 is moved by an external force or as a subject moves.

An image captured through the camera may refer to an image obtained by capturing a preview image, for example. For example, the image may be captured as an image capture button output on the display unit of the mobile terminal is touched, as a user's gesture associated to capture a preview image is sensed through the preview image, or as a physical button provided in the mobile terminal is pressed.

An image described in this disclosure may refer to at least one of a preview image and a captured image.

Depth information described in this disclosure may be a depth value. The depth information may refer to a distance (or a distance value) between a subject corresponding pixels included in the image and the mobile terminal (specifically, the camera).

For example, in cases where a subject corresponding to a specific pixel of the image and the mobile terminal is n, depth information of the specific pixel may be a specific value corresponding to n. The specific value corresponding to n may be n or a value converted by a preset algorithm.

Also, the depth information may be a value corresponding to a z axis perpendicular to an x axis and a y axis in cases where coordinates of the image are set to the x axis and the y axis perpendicular to the x axis. An absolute value of the depth information may be increased as a distance between the subject and the mobile terminal is increased.

The depth information may be utilized in various fields. For example, the depth information may be used for capturing/generating a 3D stereoscopic image (stereoscopy), used for generating 3D printing data used in a 3D printer, or used for detecting movement of an object (or subject) around the mobile terminal.

The mobile terminal related to the present disclosure may extract depth information of an image received (or captured) through the camera in various manners. For example, the control unit 180 may extract depth information through a stereo vision scheme of extracting depth information using at least two cameras, a structure light scheme of extracting depth information using light emitting elements (or light emitting elements) disposed to form a preset pattern, a time of flight (ToF) scheme of extracting depth information on the basis of time during which light emitted from a light emitting element is reflected to be returned, or any combination thereof.

Hereinafter, extracting depth information using the structure light scheme, among the aforementioned schemes, will be largely described.

The structure light scheme is a scheme of emitting light to a subject by controlling a plurality of light emitting elements disposed to have a preset pattern, sensing light reflected from the subject, and subsequently extracting depth information on the basis of the sensed light (or a pattern of sensed light).

In detail, the structure light scheme is a scheme of extracting depth information by irradiating light to a subject from a plurality of light emitting elements disposed to have a preset pattern and calculating a shift amount (or a shift amount of a reflected light pattern) of reflected light returned with respect to the preset pattern.

For example, the control unit 180 of the mobile terminal related to the present disclosure controls the plurality of light emitting elements disposed to have a preset pattern to emit light to the subject. Thereafter, the control unit 180 of the mobile terminal may sense light reflected and returned from the subject through the sensing unit 140 of FIG. 1A.

Here, the control unit 180 may extract depth information of an image received through the camera 121on the basis of the sensing result. For example, the control unit 180 may extract depth information of the image received through the camera 121 by comparing the pattern formed by light which is reflected and returned with the preset pattern.

In detail, the control unit 180 may extract depth information of the image received through the camera 121 by comparing a preset pattern in which a plurality of light emitting elements emit light to the subject (or a preset pattern in which the plurality of light emitting elements are disposed) and a pattern formed by reflected and returned light (or optical spot) and calculating a shift amount regarding each of the reflected and returned light (or optical spot) with respect to the preset pattern (or a changed form, a changed distance, a changed direction, and the like) or a shift amount regarding a pattern of returned light.

In another example, in the structure light scheme, the control unit 180 may extract depth information of the image received through the camera 121 by comparing time during which light emitted from the plurality of light emitting elements is reflected to be returned and strength of reflected and returned light.

To this end, the plurality of light emitting elements may be formed to emit light to a space corresponding to the image received through the camera 121.

The preset pattern may be determined (or set) by the user or may be predetermined when a product of the mobile terminal was manufactured. Also, the preset pattern may be changed according to a user request or by controlling of the control unit.

Also, the plurality of light emitting elements may emit infrared light. Also, the light emitting devices may be laser diodes changing an electrical signal into an optical signal. For example, the light emitting devices may be a vertical cavity surface emitting laser (VCSEL).

In the present disclosure, depth information of the image may be extracted through one camera (infrared camera or a 3D camera) using the structure light scheme, and even when the subject has a single color, depth information may be extracted. Also, accuracy regarding depth information may be enhanced by combining the structure light scheme and a stereo vision scheme using at least two cameras or combining the structure light scheme and the ToF scheme.

The ToF scheme may be a scheme of measuring depth information of an image by calculating a time during which light directly irradiated on an object is returned as reflected light The stereo vision scheme may be a scheme of symmetrically disposing a plurality of cameras (e.g., two cameras) and extracting depth information of an image received through the camera using disparity (or a difference in distance, space) between an image received through a first camera (e.g., a left camera) among the plurality of cameras and an image received through a second camera (e.g., a right camera) among the plurality of cameras.

The mobile terminal related to the present disclosure may use the stereo vision scheme, the structure light scheme, a time of flight (ToF) method, or a combination of two or more thereof.

Figure 2:
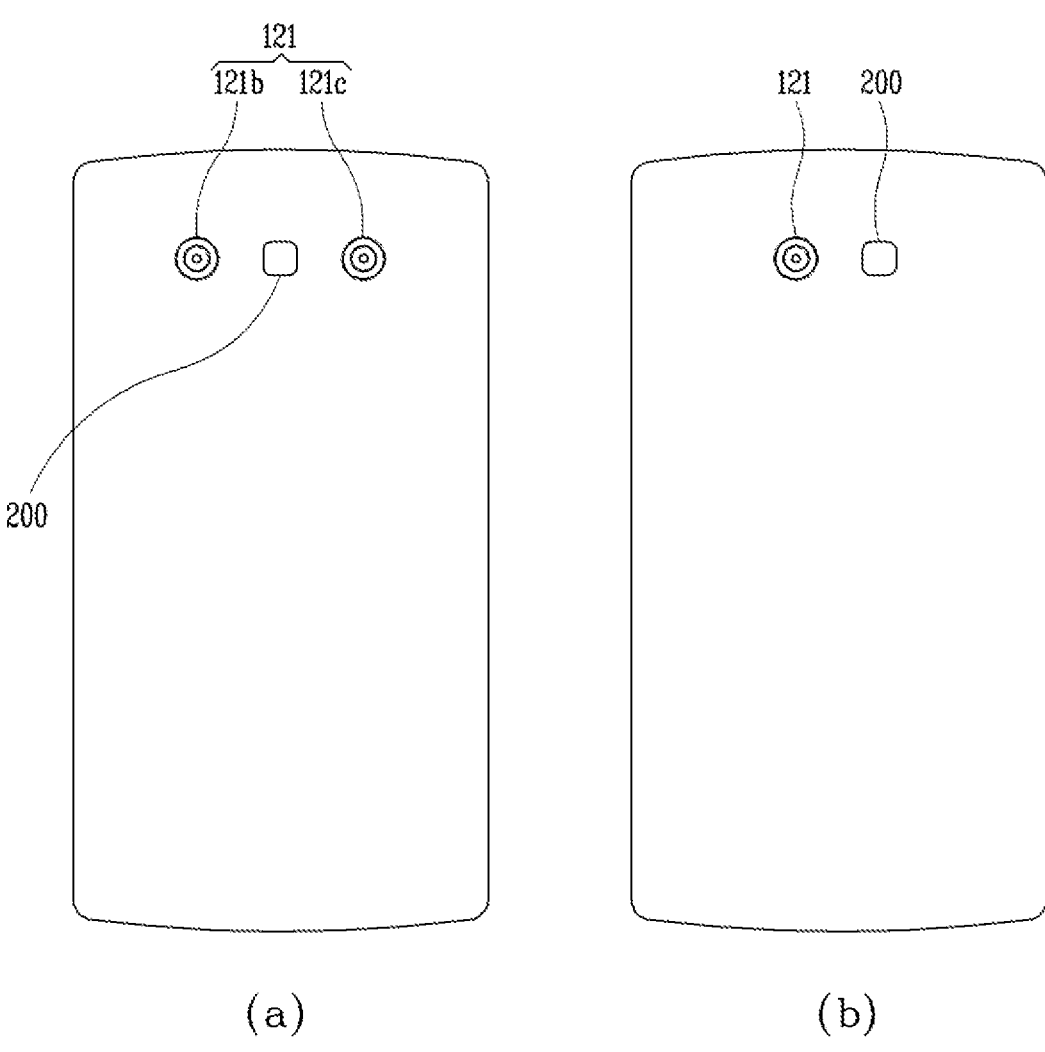
FIG. 2 is a conceptual view illustrating a camera and a lighting device provided in the mobile terminal related to the present disclosure.

FIG. 2 is a conceptual view illustrating a camera and a lighting device provided in the mobile terminal related to the present disclosure.

As illustrated in (a) of FIG. 2, the mobile terminal related to the present disclosure may have a plurality of cameras 121b and 121c on one surface thereof. Here, one surface of the mobile terminal 100 may be at least one of a rear surface, a front surface, and a side surface of the main body of the mobile terminal.

In (a) of FIG. 2, it is illustrated that the plurality of cameras 121b and 121c are provided on the rear surface of the main body of the mobile terminal.

Also, a lighting device 200 of the present disclosure may be provided on one surface on which the plurality of cameras 121b and 121c are provided.

The lighting device 200 may include a plurality of light emitting elements, and as described above, the lighting device 200 may irradiate light having a preset pattern to extract depth information of an image through the structure light scheme. Here, the plurality of light emitting elements (or a plurality of light sources) may be, for example VCSEL.

As illustrated in (a) of FIG. 2, the mobile terminal of the present disclosure may extract depth information of an image received through the cameras by combining the stereo vision scheme and the structure light scheme using the plurality of cameras 121a and 121b and the lighting device 200 capable of irradiating light of a preset pattern.

However, without being limited thereto, although the plurality of cameras 121a and 121b are provided on one surface of the main body of the mobile terminal, the mobile terminal 100 of the present disclosure may extract depth information of an image received through the cameras using any one of the stereo vision scheme, the structure light scheme, and the ToF scheme or by combining at least two schemes.

However, without being limited thereto, as illustrated in (b) of FIG. 2, the mobile terminal 100 of the present disclosure may extract depth information of an image received through the camera using one camera 121 and the lighting device 200, using only the structure light scheme, using only the ToF scheme, or using a combination of the structure light scheme and the ToF scheme.

Meanwhile, the lighting device 200 provided in the mobile terminal 100 related to the present disclosure may irradiate light to form (or have) a predetermined pattern as described above in the structure light scheme. The lighting device 200 may include a plurality of light emitting elements. Here, the light emitting elements may be the aforementioned VCSEL.

The plurality of light emitting elements may be formed to have a preset pattern or only some of the light emitting elements may be turned on to irradiate light in a preset pattern.

The plurality of light emitting elements (or a die including the plurality of light emitting elements) may be referred to as a VCSEL array, for example.

The control unit 180 of the mobile terminal related to the present disclosure may individually control each of the plurality of light emitting elements (the plurality of light sources) included in the lighting device 200. In detail, the control unit 180 may individually turn on or off the plurality of light emitting elements provided in the lighting device 200. Also, the control unit 180 may individually control emission intensity of the plurality of light emitting elements provided in the lighting device 200. Also, the control unit 180 may individually control (determine) an emission timing of the plurality of light emitting elements provided in the lighting device 200.

The lighting device 200 may be individually turned on or off, varied in emission intensity, or changed in an emission timing under the control of the control unit 180. Accordingly, a pattern (i.e., a preset pattern) of light irradiated from the lighting device 200 may be varied.

In this manner, in the lighting device 200 included in the mobile terminal of the present disclosure, a pattern (or intensity of light, a timing of light) of irradiated light may be varied by individually controlling the plurality of light emitting elements (the plurality of VCSELs), and in this point of view, the lighting device 200 may be referred to as active lighting.

Meanwhile, the lighting device 200 related to the present disclosure may irradiate light (or optical spot) of a preset pattern such that the light may be used for extracting depth information of an image. Here, the optical spot may refer to a region (or point) of a subject to which light is irradiated or a region (or a point) of the mobile terminal (or the lighting device 200, the camera, or the sensing unit) to which light reflected from a subject is irradiated.

Here, in the present disclosure, since the plurality of light emitting elements included in the lighting device 200 are laser diodes (e.g., VCSELs), and thus, when the plurality of light emitting elements emit light, light (laser) is irradiated on a narrow region (or point) of a subject. Accordingly, an optical spot may be formed in the subject. Also, in the present disclosure, on the basis of light (laser) reflected to be returned from the subject to the mobile terminal, an optical spot irradiated on the subject may be detected.

Meanwhile, the lighting device 200 may include a diffractive optical element (DOE). The DOE may be formed to diffract light (laser) output from the light emitting elements.

The DOE may diffract light output from the light emitting element into a plurality of light beams. In this disclosure, diffracting light (laser) may be understood as splitting light, duplicating light, refracting a portion of light, and the like. In cases where one light output from the light emitting element is diffracted (or split) into a plurality of light beams by the DOE, the sum of intensity of the plurality of light beams may be equal to intensity of the one light.

In other words, intensity of each of the plurality of light beams (i.e., any one of the plurality of light beams diffracted by the DOE) may be weaker than intensity of the one light beam before entering the DOE.

Meanwhile, the lighting device of the present disclosure may output a larger number of light beams (optical spots) than the number of the plurality of light emitting elements using the DOE.

For example, in cases where the number of the plurality of light emitting elements is n and the number of light beams (optical spots) output when one light beam passes through the DOE is m, the lighting device 200 of the present disclosure may output n*m number of light beams (optical spots) (or irradiate the n*m number of light beams to a subject).

In the present disclosure, the lighting device 200 may have a plurality of light emitting elements and a DOE, and the DOE may diffract light output from the plurality of light emitting elements such that a predetermined pattern is formed with respect to each of the plurality of light emitting elements.

That is, the lighting device 200 of the present disclosure may include the DOE for diffracting light such that each of the light sources has the predetermined pattern. In other words, the DOE included in the lighting device 200 may diffract light such that one light beam output from one light emitting element forms the predetermined pattern. Accordingly, a plurality of light beams output from the plurality of light emitting elements may be diffracted to form the predetermined pattern and pass through the DOE.

In this specification, extracting depth information of an image may include extracting (calculating) distance information from the mobile terminal (or the lighting device) to a subject.

In addition, the mobile terminal in the present disclosure may perform face recognition, space scanning, or 3D image generation by extracting (calculating) the depth information to the object.

Hereinafter, the lighting device described above is referred to as a lighting unit 200, and it is described that, among functions of the camera 121, a function of receiving light is performed by a sensor unit 210.

The sensor unit 210 may function as a light reception unit configured to receive light output from the lighting unit 200, reflected by the subject, and returning to the mobile terminal.

Hereinafter, measurement of a distance to a subject using the ToF scheme, among methods of measuring a distance to the subject, is described as an example. However, the measurement of a distance to a subject is not limited thereto. The description in this specification may be identically/similarly applied to the stereo vision scheme, the structure light scheme, or a combination of two or more of the schemes described above.

Figure 3:
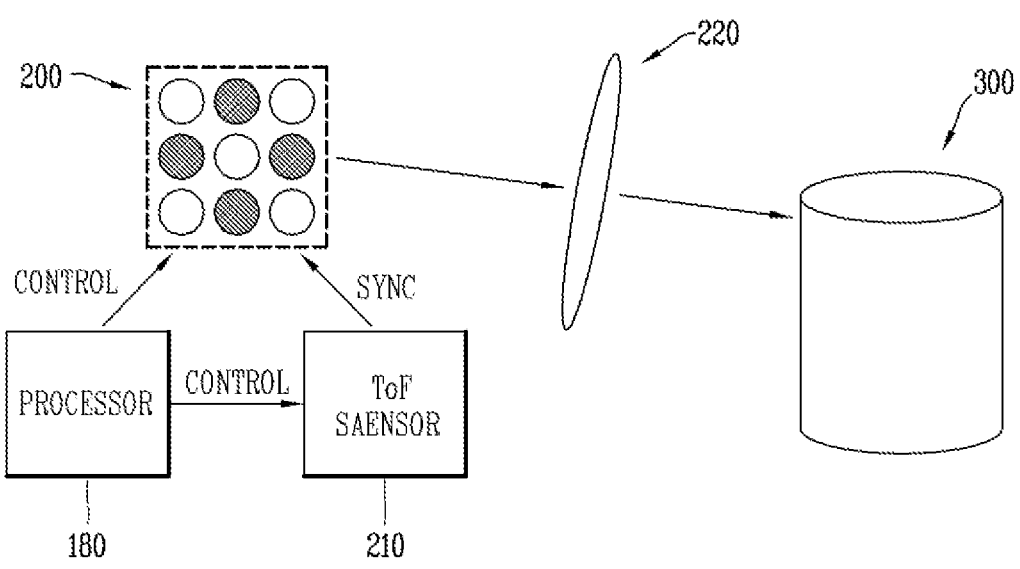
FIG. 3 is a conceptual view illustrating a distance measurement system according to an embodiment of the present disclosure.

FIG. 3 is a conceptual view illustrating a distance measurement system according to an embodiment of the present disclosure.

Referring to FIG. 3, the mobile terminal according to an embodiment of the present disclosure may include the lighting unit 200 (or a lighting device) including a plurality of light sources (or a plurality of light emitting elements), the sensor unit 210 (or the camera 121) configured to receive light output from the lighting unit 200 and reflected off a subject 300, and the control unit 180 (or a processor) configured to control the lighting unit 200 and the sensor unit 210.

In addition, the mobile terminal in the present disclosure may further include an optical system 220 configured to transmit light, output from the lighting unit 200, to be emitted toward the subject.

For example, the light sources may be VCSELs (or light-emitting diodes (LEDs) or laser diodes (LDs)), and the optical system 220 may be a lens.

As another example, the light sources may be VCSELs (or LEDs or LDs), and the optical system 200 may be a diffractive element (e.g., a diffuser, a DOE, a microlens array, a grating, a holographic optical element (HOE), etc.).

In addition, as another example, the light sources may be VCSELs (or LEDs or LDs), and the optical system 220 may be provided in an order of a lens to a diffractive element, or vice versa.

The lens may include a refractive lens and a reflective mirror.

Lighting may be uniform lighting (LEDs, LDs) or pattern lighting (VCSEL or an LD).

A plurality of lighting units 200 including the lighting sources may be present.

The lighting units 200 may include an auto focus (AF) unit and/or an iris, and an optical image stabilizer (OIS) driving system.

The optical system 220 may be implemented in various forms. The optical system 220 will be described later in detail with reference to the attached drawings.

The control unit 180 may synchronize, through the sensor unit 210, areas toward which lights output from the light sources are emitted.

Figure 4A:
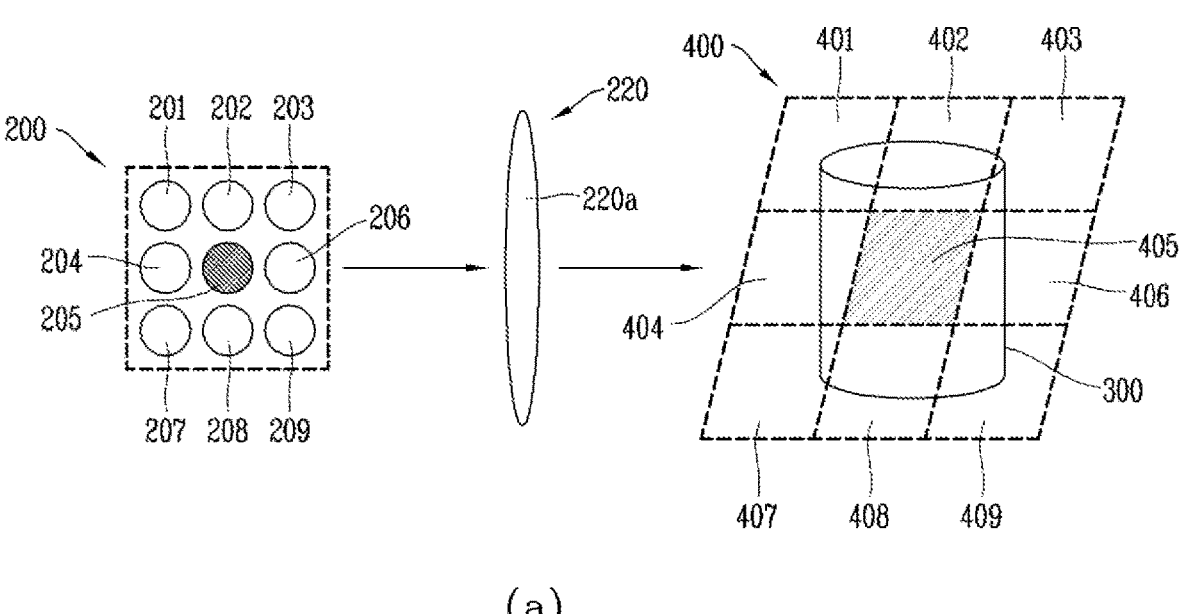
FIGS. 4A and 4B are conceptual views illustrating a lighting control method according to a first embodiment of the present disclosure.
Figure 4A:
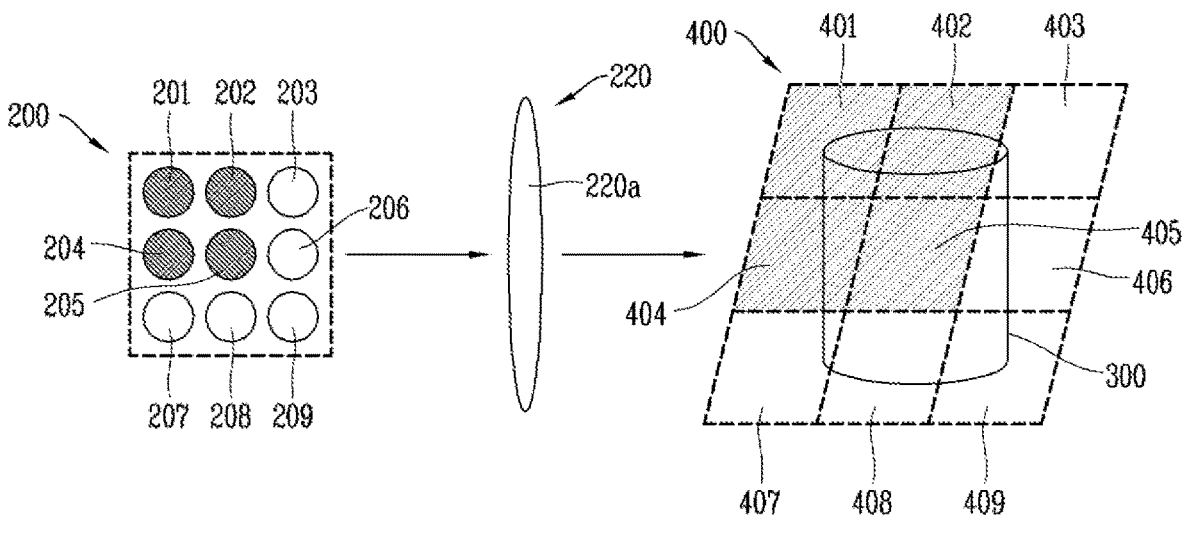

For example, referring to (a) of FIG. 4A, the control unit 180 may synchronize a first light source 201, among the light sources, to emit light toward a first area 401 and a second light source 202, other than the first light source 201 among the light sources, to emit light toward a second area 402 other than the first area 401.

This may mean a process (a synchronization process) in which the control unit 180 controls each of the light sources to output light, determines, through the sensor unit 210, an area toward which each of the light sources emits the light, and adjusts the area toward which each of the light sources emits the light.

Figure 5A:
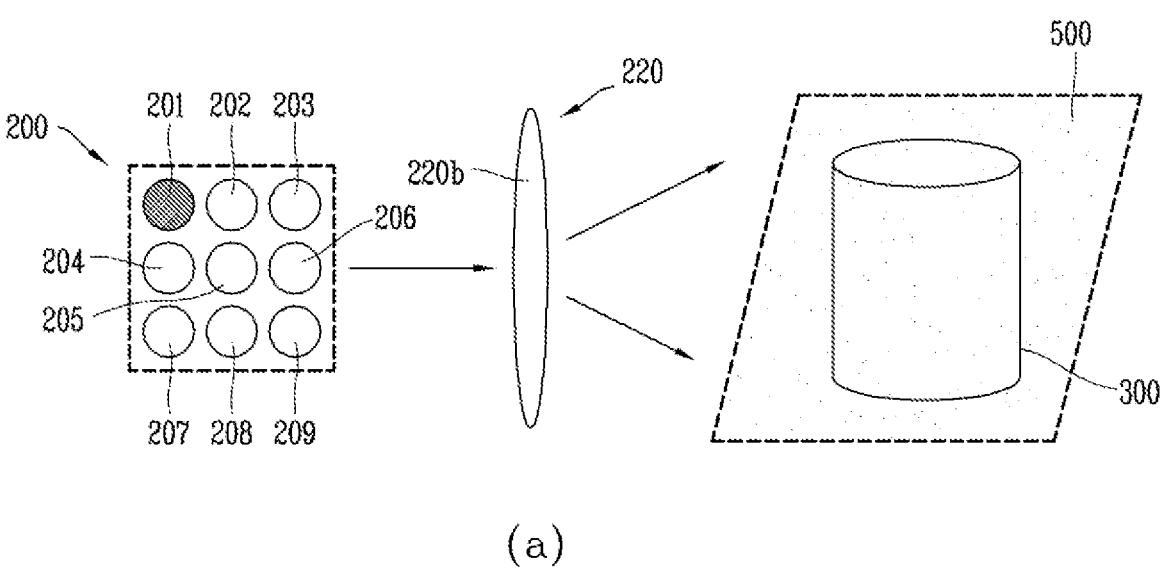
FIGS. 5A and 5B are conceptual views illustrating a lighting control method according to a second embodiment of the present disclosure.
Figure 5A:
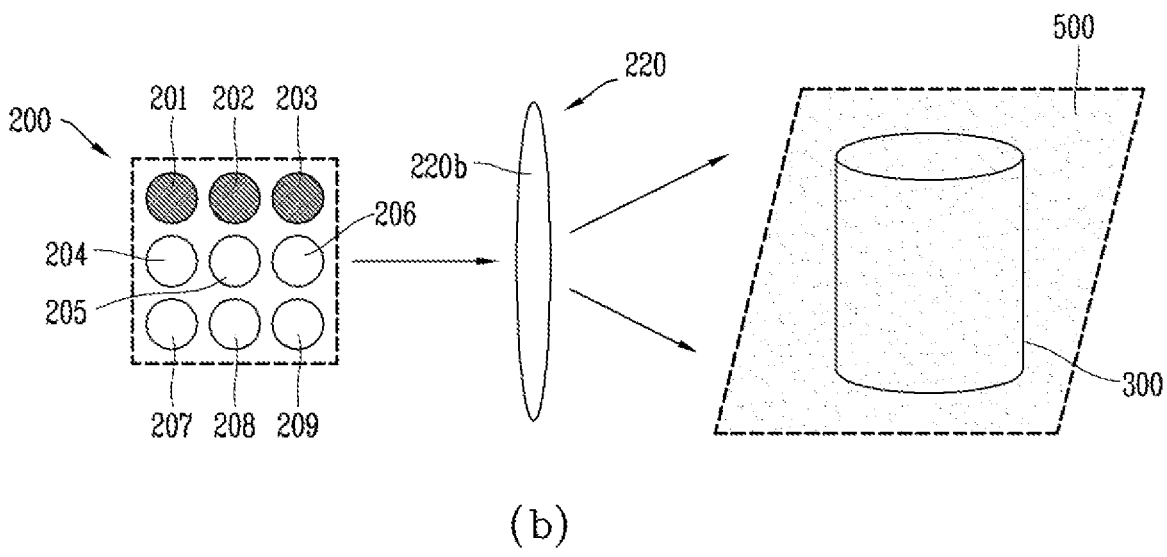

As another example, referring to (a) of FIG. 5A, the control unit 180 may synchronize the light sources all to emit light beams toward a same area 500, respectively. For example, the control unit 180 may synchronize the first light source 201 among the light sources to emit light toward the same area 500 and the second light source 202 other than the first area 201, among the light sources, to emit light toward the same area 500.

To perform synchronization, the control unit 180 may adjust an installation angle, a light-emission angle, a viewing angle, or the like with respect to each of the light sources, or vary the optical system 220.

In addition, the control unit 180 may control the lighting unit 200 so that at least one of the lighting sources emits light, on a basis of preset conditions.

The preset conditions may refer to conditions on which at least a part of the light sources emits light, for example, a condition on which the lighting unit 200 is set to emit light.

For example, the preset conditions may include a case when a user manipulation to turn the lighting unit 200 on is performed. a case when a situation in which face recognition is needed occurs (e.g., a case when face recognition is set to be performed when a lock is released, a case when face recognition is set to be performed when user authentication such as log-in, payment, etc. is performed), a case when a mode in which a 3D image is captured is entered on a basis of information about a distance to a subject (or depth information about an image), etc.

The control unit 180 may control the lighting unit 200 so that at least one of the lighting sources emits light, on the basis of the preset conditions.

A method of controlling the lighting unit 200 (that is, a method of controlling the light sources) may vary according to a type of the preset conditions.

When a first condition among the preset conditions is satisfied, the control unit 180 may control the light sources using a first control method. When a second condition other than the first condition, among the preset conditions, is satisfied, the control unit 180 may control the light sources using a second control method other than the first control method.

Hereinafter, various methods of controlling the lighting unit 200 are described in detail with reference to the attached drawings.

Figure 4B:
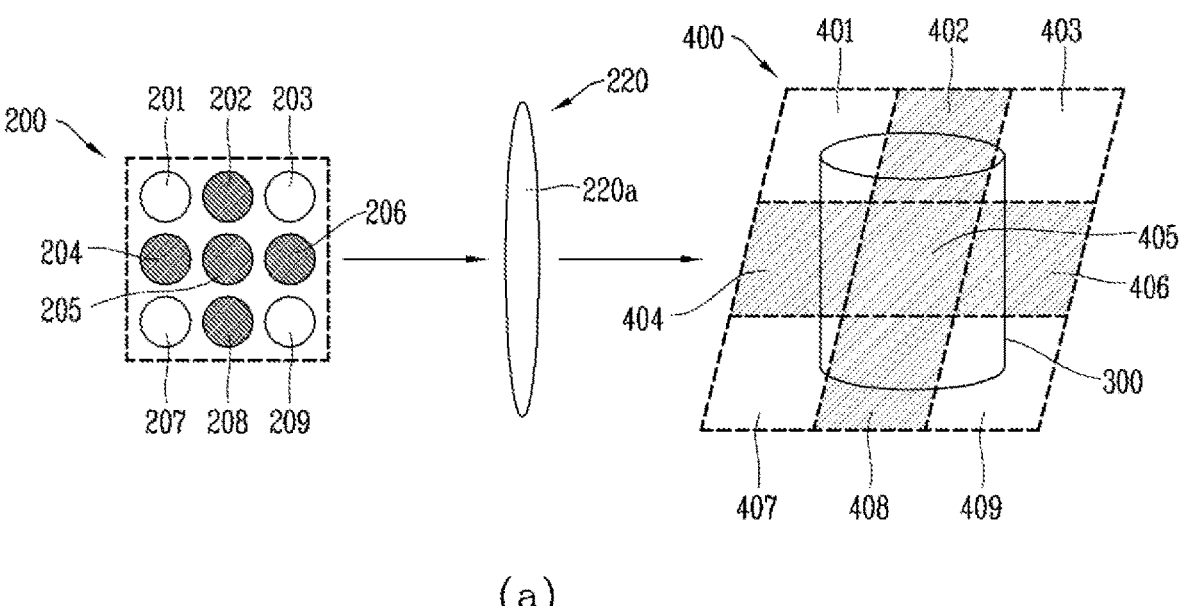

FIGS. 4A and 4B are conceptual views illustrating a lighting control method according to a first embodiment of the present disclosure.

According to the first embodiment, the lighting unit 200 in the present disclosure may include a plurality of light sources 201 to 209 which are first to ninth light sources.

The light sources 201 to 209 may be provided to emit light toward areas different from each other.

As an example, the lighting unit 200 may be provided to emit light toward a predetermined area 400.

Here, the first light source 201 among the light sources 201 to 209 may be provided to emit light toward the first area 401, and the second light source 202 other than the first light source 201, among the light sources 201 to 209, may be provided to emit light toward the second area 402 other than the first area 401.

That is, the first area 401 toward which the light output from the first light source 201 is emitted may not overlap the second area 402 toward which the light output from the second light source 202 is emitted.

To do so, the present disclosure may include a first optical system 220a configured to refract (control) light from the light sources 201 to 209 to be emitted toward areas 401 to 409 that do not overlap each other.

The control unit 180 in the present disclosure may independently control the light sources 201 to 209 included in the lighting unit 200.

Accordingly, as illustrated in (a) of FIG. 4A, the control unit 180 may control only the light source 205 among the light sources 201 to 209 to emit light. In this case, the light from the light source 205 may be emitted, via the first optical system 220a, toward the area 405 to which light emission from the light source 205 is allocated.

In addition, as shown in (b) of FIG. 4A, when the control unit 180 controls the first, second, fourth, and fifth light sources 201, 202, 204, and 205 among the light sources 201 to 209 to emit light, the light may be emitted toward the areas 401, 402, 404, and 405 to which the emission of the light therefrom is allocated and which do not overlap each other, respectively.

In addition, as shown in (a) of FIG. 4B, when the second, fourth, fifth, sixth, and eighth light sources 202, 204, 205, 206, and 208 are controlled to emit light, the light may be emitted only toward the areas 402, 404, 405, 406, and 408 to which the emission of the light therefrom is allocated, respectively.

In addition, when the control unit 180 controls all the first to ninth light sources 201 to 209 included in the lighting unit 200 to emit light, the light may be emitted toward a whole predetermined area 400 to which the emission of the light therefrom is allocated, as shown in (b) of FIG. 4B.

As such, in the present disclosure, a plurality of light sources may be independently controlled, and the light sources may be also controlled to emit light toward areas different from each other according to preset conditions.

In addition, the control unit 180 may determine a form of a subject via a camera (or an area of the subject in an image received via the camera), and control at least one of the light sources to emit light on a basis of the form of the subject.

In this case, the control unit 180 may control the light sources such that a light source does not emit light when the light source is allocated to emit light toward an area that does not include the subject, and a light source emits light when the light source is allocated to emit light toward an area including the subject.

By doing so, in the present disclosure, light emission toward an unnecessary area may be minimized, and thus, power consumption may be prevented.

Figure 5B:
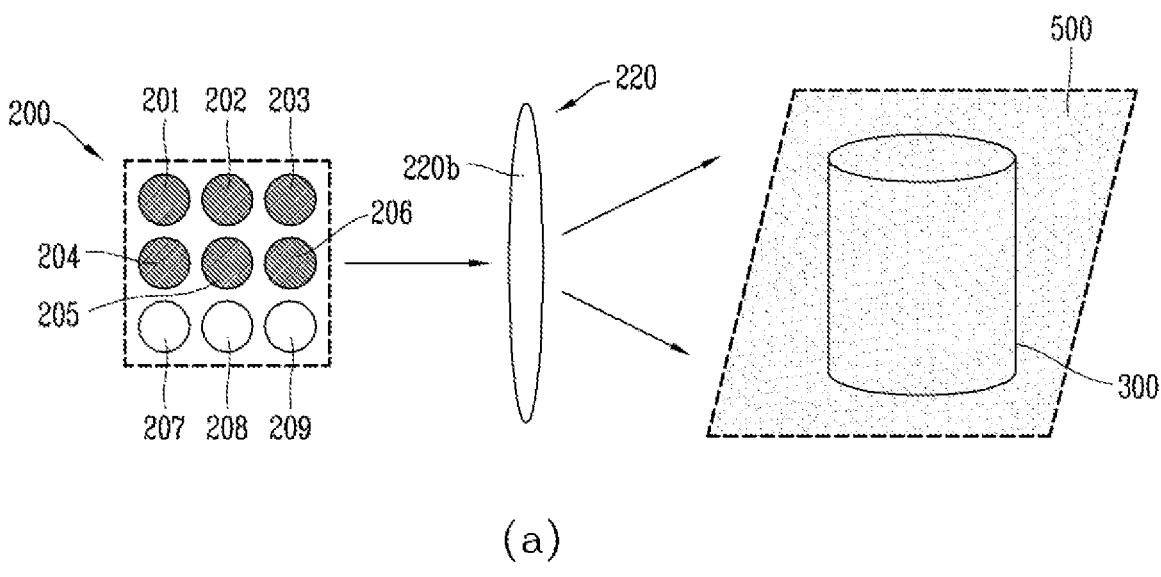
Figure 5B:
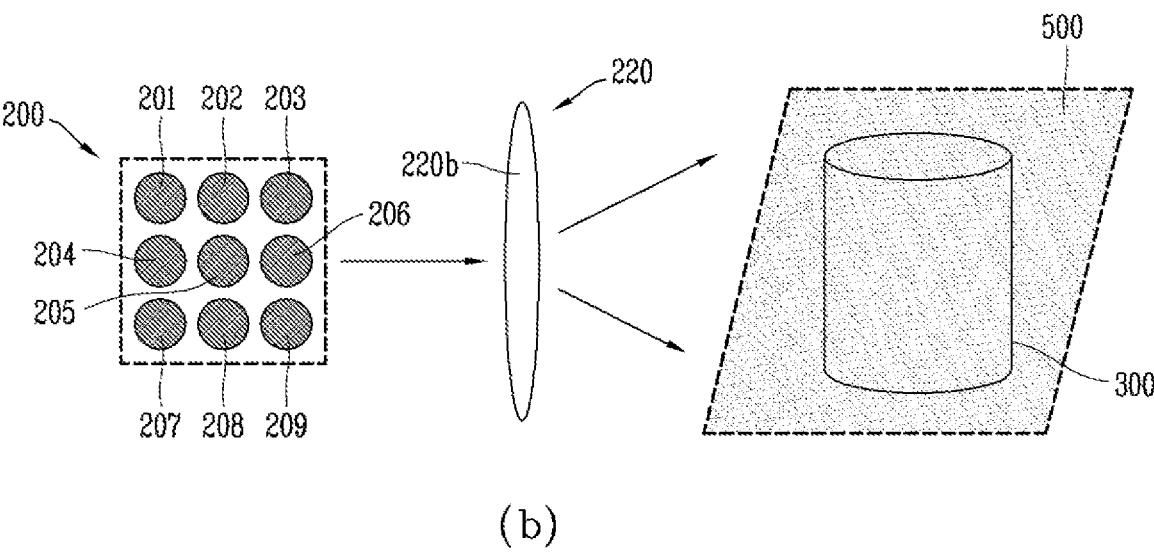

FIGS. 5A and 5B are conceptual views illustrating a lighting control method according to a second embodiment of the present disclosure.

Referring to FIG. 5A, in the present disclosure, a second optical system 220b provided such that each of the light sources 201 to 209 to emit light toward the same area 500 (or referred to as a particular area) may be further included.

That is, unlike the mobile terminal according to the first embodiment, the mobile terminal according to the second embodiment of the present disclosure shown in FIG. 5A may be provided such that the light sources 201 to 209 all emit light toward the same area 500.

To do so, as illustrated in (a) and (b) of FIG. 5A, the second optical system 220b may refract light so that the first light source 201 among the light sources 201 to 209 emits light toward the same area 500 and the second to ninth light sources 202 to 209 other than the first light source also emit light toward the same area 500.

In this case, density of the light emitted toward the same area 500 may vary according to a number of light sources emitting light, among light sources 201 to 209.

That is, the light density means light intensity emitted toward each unit area (or a light strength or a number of light spots). Accordingly, when a number of light sources emitting light increases, the light density may also increase.

That is, the control unit 180 may control the light sources 201 to 209 to vary the light density in the same area 500.

As illustrated in (a) of FIG. 5B, the control unit 180 may control the lighting unit 200 so that a first number of light sources (e.g., six light sources), among the light sources 201 to 209, emits light with a first density toward the same area 500.

In addition, as illustrated in (b) of FIG. 5B, the control unit 180 may control the lighting unit 200 so that a second number of light sources (e.g., nine light sources) greater than the first number of light sources, among the plurality of light sources 201 to 209, emit light with a second density, higher (greater) than the first density, toward the same area 500.

As such, in the present disclosure, the light sources 201 to 209 may be controlled to emit light toward areas different from each other via the optical system 220, or controlled to emit light toward the same area 500.

Thus, the first and second optical systems 220*a* and 220*b* may be provided to be rotated (or replaced) to be positioned in front of the lighting unit 200 according to control by the control unit 180.

To do so, the mobile terminal in the present disclosure may further include a driving unit (not shown) configured to rotate the first and second optical systems 220*a* and 220*b*, and the driving unit may be driven according to the control by the control unit 180 or a user manipulation.

The first and second optical systems 220*a* and 220*b* may be provided to be rotated by the driving unit.

The mobile terminal may selectively include the first or second optical system 220*a* or 220*b*.

As another example, the optical system 220 may be provided to be varied as the first or second optical system 220*a* or 220*b*. For example, the optical system 220 may be varied to perform a function of the first optical system 220*a* or the second optical system 220*b* according to the control by the control unit 180.

As an example, the optical system 220 may be a variable optical system provided to be driven as the first optical system 220*a* or the second optical system 220*b* according to an electrical signal.

FIGS. 6 to 10 are conceptual views illustrating a method of controlling the light sources 201 to 209 according to the present disclosure.

The description provided with reference to FIGS. 6 to 10 may be also applied identically/similarly to the first and second embodiments described with reference to FIGS. 4A, 4B, 5A, and 5B.

As such, in the present disclosure, the light sources 201 to 209 may be independently controlled. As the light sources 201 to 209 may be controlled to emit light toward areas different from each other, the light may be emitted toward only some areas or toward a same area, and thus, light density may be varied.

When the control unit 180 in the mobile terminal in the present disclosure controls at least a part (one or more) of the light sources to emit light, the control unit 180 may control the at least part of the light sources to emit the light using various methods.

Figure 6:
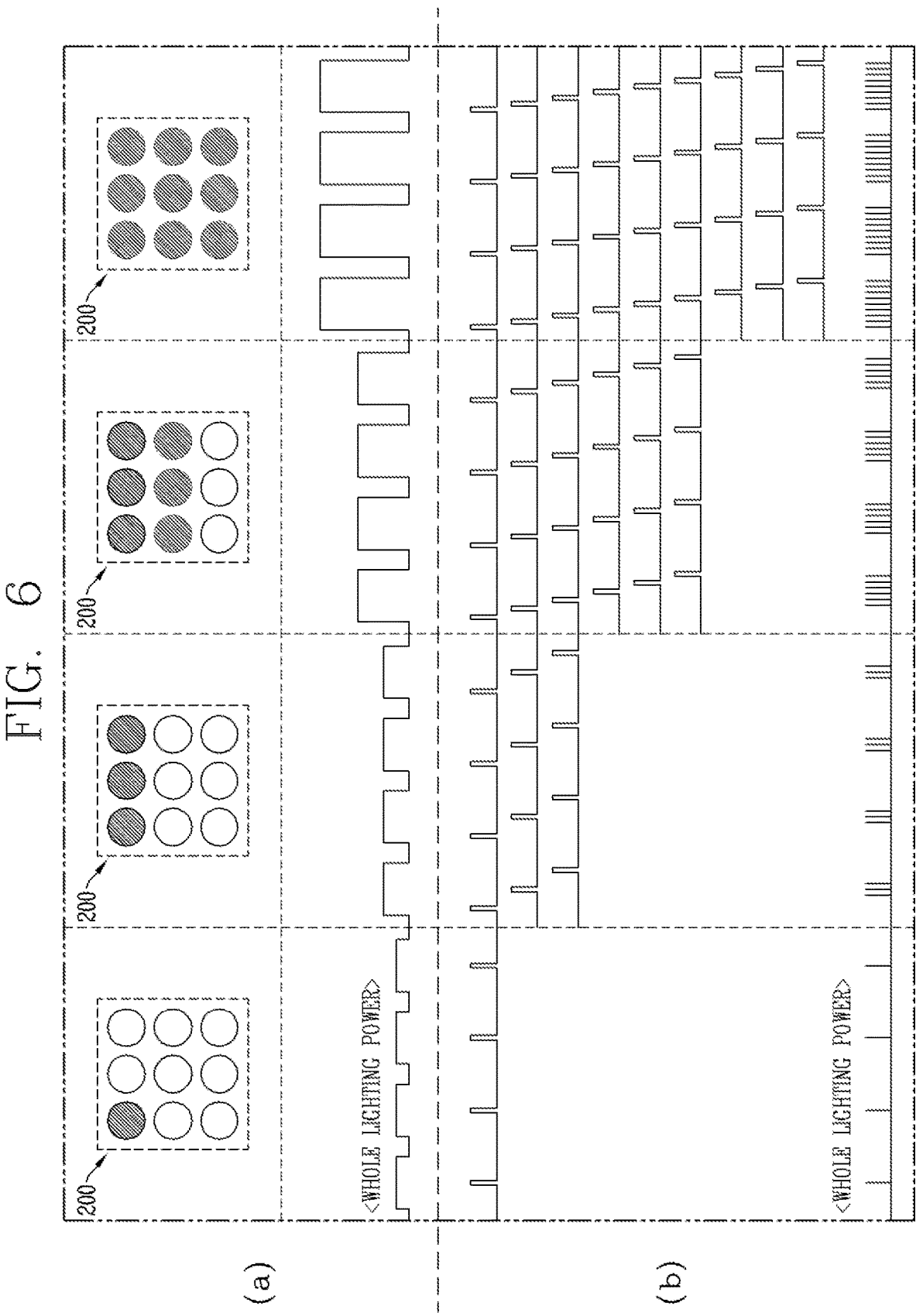
FIGS. 6 to 10 are conceptual views illustrating a method of controlling a plurality of light sources in the present disclosure.

For example, as illustrated in (a) of FIG. 6, when the control unit 180 controls at least a part of the light sources to emit light, the control unit 180 may control the at least part of the light sources to emit the light at same time.

In this case, as illustrated in (a) of FIG. 6, when a number of the at least part of light sources increases (from 1, 3, 6, to 9 light sources), power (peak power or peak current) needed for lighting may also increase.

As another example, as illustrated in (b) of FIG. 6, when the control unit 180 controls at least a part of the light sources to emit light, the control unit 180 may control the at least part of the light sources to sequentially emit light one by one.

In this case, the control unit 180 may control the at least part of the light sources to sequentially emit the light one by one so that times at which the at least part of power sources emit the light do not overlap each other.

When the at least part of the light sources sequentially emits light one by one, peak power needed for the at least part of the light sources to emit the light may be constant regardless of a number of the at least part of the light sources emitting light, as illustrated in (b) of FIG. 6.

That is, as illustrated in (b) of FIG. 6, when the at least part of the light sources sequentially emit light one by one at times that do not overlap each other, the peak power needed for the light emission from the light sources (that is, the peak power needed for the light emission from the at least part of the light sources) may be constant (identical) regardless of the number of the light sources emitting light (that is, regardless of whether light is emitted by one, three, six, or nine light sources).

The constant peak power may be peak power needed for one light source to emit light.

Since the light sources emit light one by one at different times (that is, at times that do not overlap each other), even when many light sources emitting light are present, the light sources may emit light at the different times. Thus, the peak power needed for the light sources to emit light (at least a part of the light sources) may be identical to (constant with respect to) peak power needed for one light source to emit light.

Accordingly, in the present disclosure, the plurality of light sources may sequentially emit light, and thus, peak power needed for the plurality of light sources to emit light may be reduced.

In the present disclosure, a driver (or a driver device) configured to control the areas 401 to 409, which are several split areas, may be further included.

Figure 7:
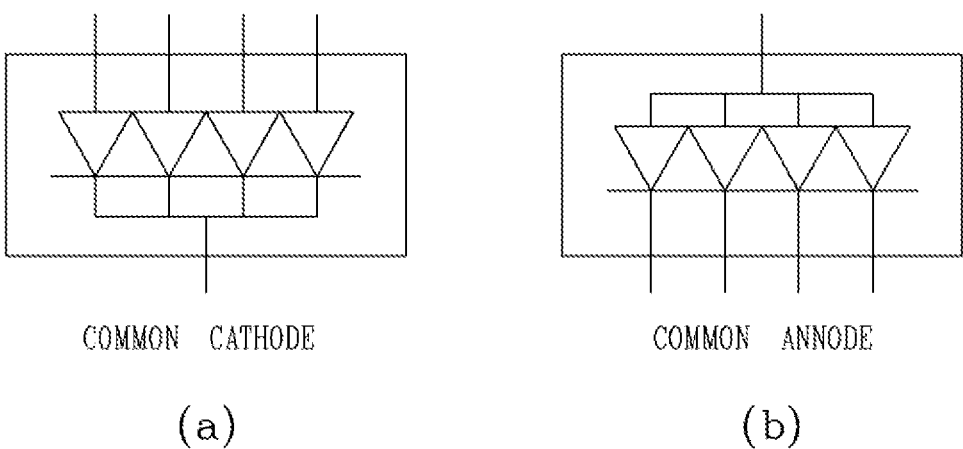

According to a structure of split lighting, the driver may have a structure of a common cathode as illustrated in (a) of FIG. 7, or a structure of a common anode as illustrated in (b) of FIG. 7.

In cases of (a) and (b) of FIG. 7 in common, the driver device may be provided to independently (separately) control each of the light sources 201 to 209 (or the split areas 401 to 409), respectively.

That is, as described with reference to FIG. 6, the driver device may control the light sources (to emit light) simultaneously at same times or sequentially control the light sources (to emit light) in consideration of lighting efficiency.

The control unit 180 may supply different powers to the light sources 201 to 209, supply power to the light sources 201 to 209 in different periods, or supply power to the light sources 201 to 209 at different times.

Figure 8:
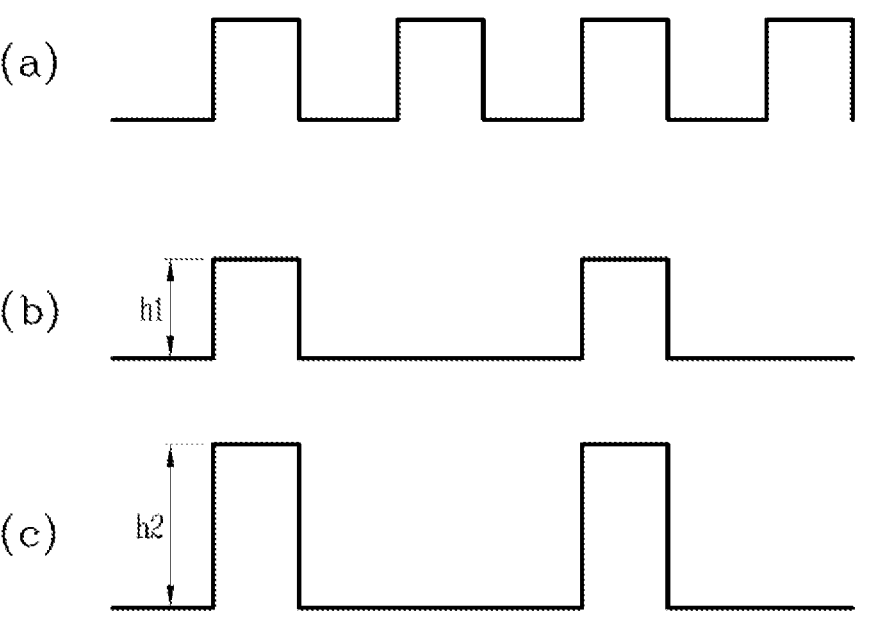

For example, as illustrated in (a) of FIG. 8, the control unit 180 may control at least a part of the light sources 201 to 209 to periodically emit light with power of constant strength at respective constant times.

As another example, as illustrated in (b) and (c) of FIG. 8, the control unit 180 may apply different powers to the light sources 201 to 209, respectively.

For example, the control unit 180 may supply power with a first magnitude h1 to a light source, or power with a second magnitude h2 greater than the first magnitude h1 to a light source.

In this case, lighting to which power with a great magnitude is supplied may emit bright light.

As such, the control unit 180 may independently control supplied power, a period, or a time with respect to light emission to thereby use the light sources 201 to 209 in correspondence with a situation (or a condition).

Figure 9:
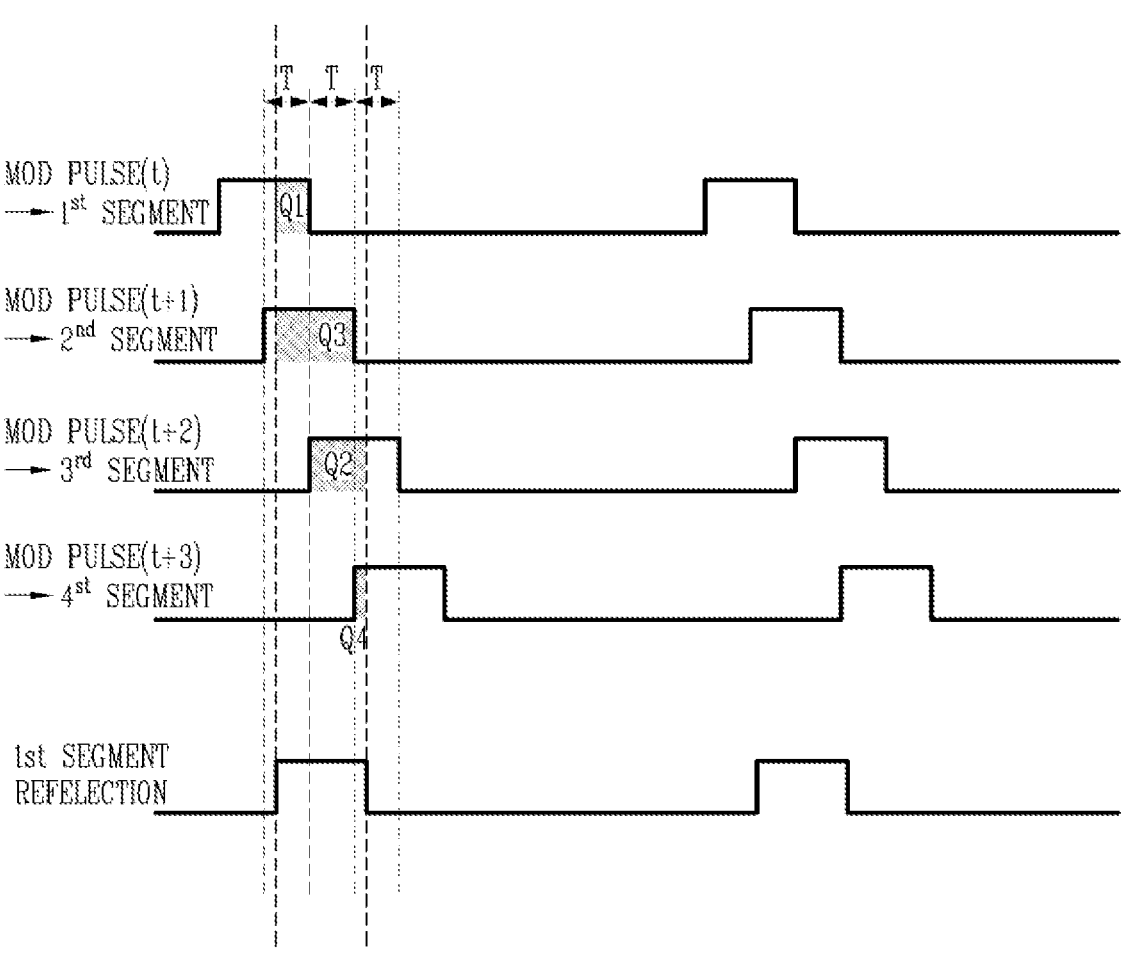

As illustrated in FIG. 9, the control unit 180 may control the light sources 201 to 209 to emit light at different times.

In this case, as illustrated in FIG. 9, the control unit 180 may control the times and the periods of light emission from the light sources 201 to 209 so that periods in which the light sources 201 to 209 emit light partially overlap each other.

For example, as illustrated in FIG. 9, the control unit 180 may control the lighting unit 200 such that a period when the first light source 201 emits light may partially overlap a period when the second light source 202 emits light.

In addition, the control unit 180 may control the lighting unit 200 such that the period when the second light source 202 emits the light may partially overlap a period when a third light source 203 emits light.

As such, unlike the description provided with reference to FIG. 6, the control unit 180 may control the light sources 201 to 209 to sequentially emit light such that periods in which the light sources 201 to 209 emit light partially overlap each other.

In this case, the control unit 180 may calculate a difference between times at which light beams emitted from the light sources at different times are reflected off the subject 300 and return, respectively, and estimate (extract) information about a distance to the subject 300 using the ToF scheme.

To do so, the control unit 180 may generate a signal for measuring a distance from the subject 300 via the light sources emitting light at different times using the sensor unit 210.

As illustrated in FIG. 9, the control unit 180 may generate a signal such that the light sources sequentially emit light in each constant period T (or a duty or a duty/2).

In detail, the control unit 180 may control the second light source 201 to emit light after the constant period T from a time after the first light source 201 emits light, and a third light source 203 to emit light after the constant period T from the time after the second light source emits the light.

In this case, a period when the first light source 201 emits the light may partially overlap a period when the second light source 202 emits the light. That is, a period in which each light source emits light may be longer than the constant period T.

In this case, phases Q1, Q2, Q3, Q4 of light output from the light sources 201 to 209, respectively, may be different from each other (a phase difference).

The control unit 180 may calculate a difference in times at which light is output from the light sources 201 to 209 and reflected off a subject, and then, return, respectively, on a basis of times at which the light sources 201 to 209 emit light, times at which the light is received via the sensor unit 210, and phases of the received light. Then, on a basis of the time difference, the control unit 180 may calculate a distance between the mobile terminal and the subject (or a distance to each part of the subject) (the ToF scheme).

Figure 10:
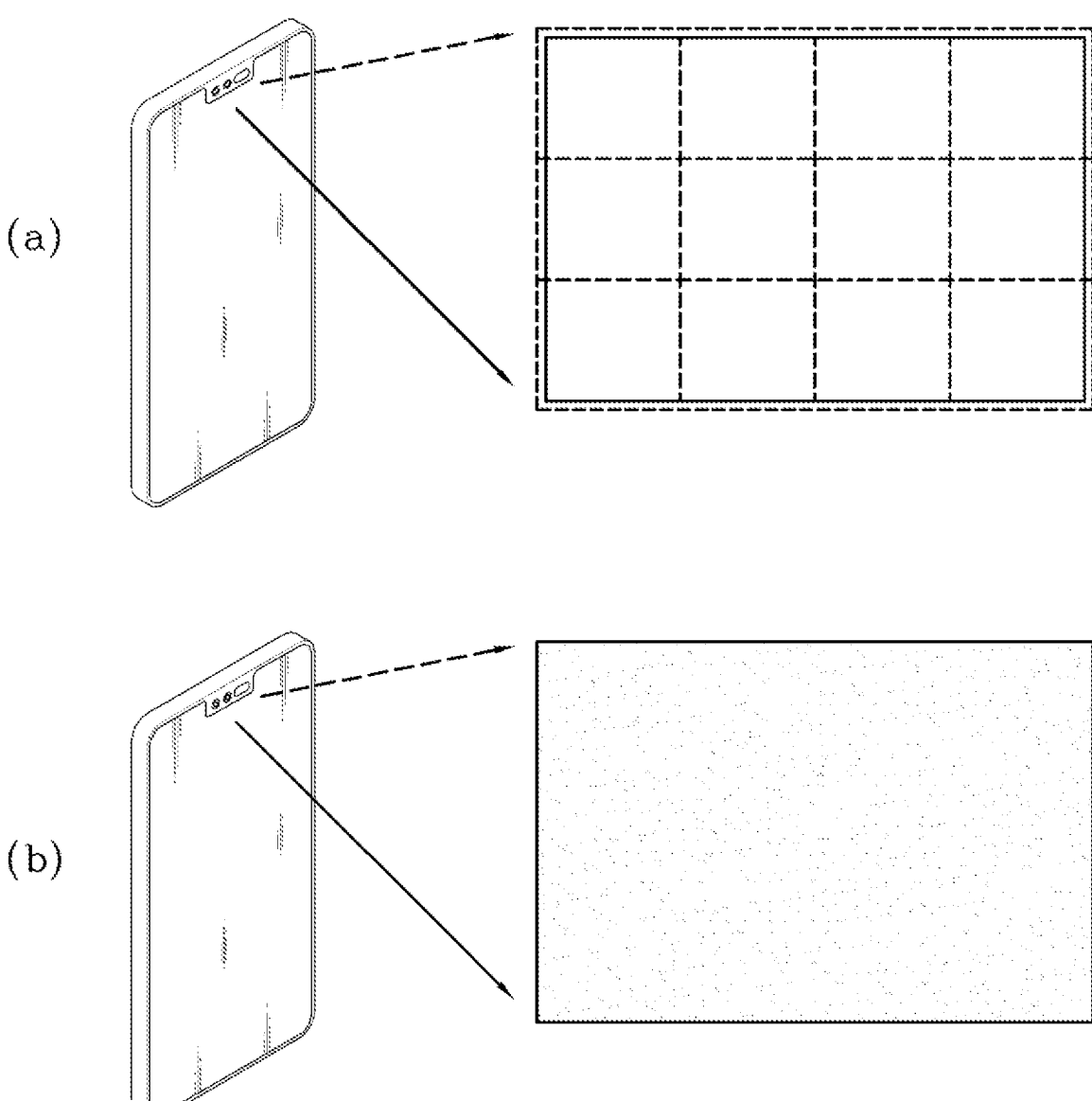

In addition, as illustrated in (a) of FIG. 10, when the control unit 180 performs face recognition (face authentication) or space scanning using the ToF scheme, the control unit 180 may control the lighting unit 200 not to emit light toward an area in which the face recognition is complete. Thus, power consumed to emit light toward an unnecessary area may be reduced.

In addition, as illustrated in (b) of FIG. 10, when the ToF scheme is used, a lighting control method capable of varying an amount or density of lighting may be provided such that that light with a high density may be emitted to increase accuracy when face authentication or space scanning is performed, and low power may be supplied with a low recognition resolution at a normal mode (a general standby situation).

In accordance with the detailed description, the present disclosure may provide a new lighting control method capable of measuring a distance only with respect to a partial area of a subject.

In addition, the present disclosure may also provide a new lighting control method capable of varying density of light needed to measure a distance to a subject, and thus, enhancing accuracy of measuring the distance to the subject by increasing the density of the light emitted toward the subject as needed.

The description provided above may be identically/similarly derived and applied to a method of controlling the mobile terminal (or a method of, when a separate lighting device is provided, controlling the lighting device).

For example, the method of controlling the mobile terminal may include synchronizing areas toward which light output from a plurality of light sources is emitted, and controlling at least one of the lighting sources to emit lights on a basis of present conditions.

In the embodiments, a first light source among the light sources is provided to emit light toward a first area, and a second light source, other than the first light source among the light sources, may be provided to emit light toward a second area other than the first area.

In the embodiments, the first and second areas may not overlap each other (that is, non-overlap each other).

In addition, in the embodiments, each of the light sources may emit light toward a same area.

In this case, the method of controlling the mobile terminal in the present disclosure may include controlling the light sources so that density of the light with respect to the same area is varied.

Besides, various controlling methods described in this specification may be applied to the method of controlling the mobile terminal in the present disclosure.

The present disclosure can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the control unit 180 of the terminal. Therefore, it should also be understood that the above-described embodiments are not limited by any of the details of the foregoing description, unless otherwise specified, but rather should be construed broadly within its scope as defined in the appended claims, Therefore, all changes and modifications that fall within the metes and bounds of the claims, or equivalents of such metes and bounds are therefore intended to be embraced by the appended claims.

What is claimed is:

1. A mobile terminal comprising:
   a lighting unit having a plurality of light sources individually configured to emit a respective one of a first plurality of light beams;
   a sensor configured to receive a second plurality of light beams as reflected by a subject, wherein the second plurality of light beams respectively correspond to the first plurality of light beams;
   a first optical system configured to cause the first plurality of light beams emitted from the plurality of light sources to be directed toward a same area; and
   a controller configured to:

determine, based on the second plurality of light beams as reflected by the subject, an area toward which each of the light sources emits a respective one of the first plurality of light beams;

synchronize areas toward which one or more of the plurality of light sources emit a respective light beam; and control the lighting unit to cause at least one of the plurality of light sources to emit a respective one of the first plurality of light beams according to a preset condition;

control the lighting unit so that a first number of light sources among the plurality of light sources emit light beams with a first density toward the same area; and control the lighting unit so that a second number of light sources greater than the first number of light sources, among the plurality of light sources, emit light beams with a second density higher than the first density toward the same area.

2. The mobile terminal of claim 1, wherein a first light source among the plurality of light sources emits the light beam toward a first area, and a second light source, among the plurality of light sources and other than the first light source, emits the light beam toward a second area other than the first area.

3. The mobile terminal of claim 2, wherein the first area does not overlap the second area.

4. The mobile terminal of claim 2, further comprising a second optical system configured to refract the first plurality of light beams emitted from the plurality of light sources so that the refracted light beams are emitted toward areas that do not overlap.

5. The mobile terminal of claim 1, wherein the controller is further configured to control at least some of the plurality of light sources to emit the first plurality of light beams at a same time.

6. The mobile terminal of claim 1, wherein the controller is further configured to control the lighting unit so that at least some of the plurality of light sources sequentially emit the first plurality of light beams one by one.

7. The mobile terminal of claim 6, wherein peak power needed for the plurality of light sources to emit the first plurality of light beams is constant regardless of a number of the at least some of the plurality of light sources emitting the first plurality of light beams, when the at least some of the plurality of light sources sequentially emit the first plurality of light beams one by one.

8. The mobile terminal of claim 1, wherein the controller is further configured to supply different powers, or power in different periods, or power at different times, to each of the plurality of light sources.

9. The mobile terminal of claim 1, wherein the controller is further configured to control the plurality of light sources to emit the first plurality of light beams at times different from each other.

10. The mobile terminal of claim 9, wherein the controller is further configured to control times at which and periods in which the plurality of light sources emit the first plurality of light beams so that the periods partially overlap.

11. The mobile terminal of claim 9, wherein the controller is further configured to generate a signal for measuring, by the sensor, a distance to the subject via the plurality of light sources emitting the first plurality of light beams at the different times.

12. A mobile terminal comprising:

a lighting unit having a plurality of light sources individually controllable and being configured to emit a respective one of a first plurality of light beams;

a sensor configured to receive a second plurality of light beams as reflected by a subject, wherein the second plurality of light beams respectively correspond to the first plurality of light beams;

a first optical system configured to cause the first plurality of light beams emitted from the plurality of light sources to be directed toward a same area; and a controller configured to:

determine, based on the second plurality of light beams as reflected by the subject, an area toward which each of the light sources emits a respective one of the first plurality of light beams;

synchronize areas toward which one or more of the plurality of light sources emit a respective light beam by adjusting an area toward which at least one of the plurality of light sources emits the light beam;

control the lighting unit so that a first number of light sources among the plurality of light sources emit light beams with a first density toward the same area; and control the lighting unit so that a second number of light sources greater than the first number of light sources, among the plurality of light sources, emit light beams with a second density higher than the first density toward the same area.

13. A method for controlling a mobile terminal, the method comprising:

determining, based on a second plurality of light beams as reflected by a subject, an area toward which each of a plurality of light sources emits a respective one of a first plurality of light beams, wherein the second plurality of light beams respectively correspond to the first plurality of light beams;

synchronize areas toward which one or more of the plurality of light sources emit a respective light beam;

causing at least one of the plurality of light sources to emit a respective one of the first plurality of light beams according to a preset condition;

causing the plurality of light sources to emit the first plurality of light beams toward a same area;

causing a first number of light sources among the plurality of light sources emit light beams with a first density toward the same area; and causing a second number of light sources greater than the first number of light sources, among the plurality of light sources, emit light beams with a second density higher than the first density toward the same area.

14. The method of claim 13, further comprising:

causing a first light source among the plurality of light sources to emit the light beam toward a first area; and causing a second light source, among the plurality of light sources and other than the first light source, to emit the light beam toward a second area other than the first area.

15. The method of claim 14, wherein the first area does not overlap the second area.

* * * * *